Oct. 22, 1929.  W. R. WHITTEMORE  1,732,705
KNIFE SHARPENER
Filed Oct. 24, 1927
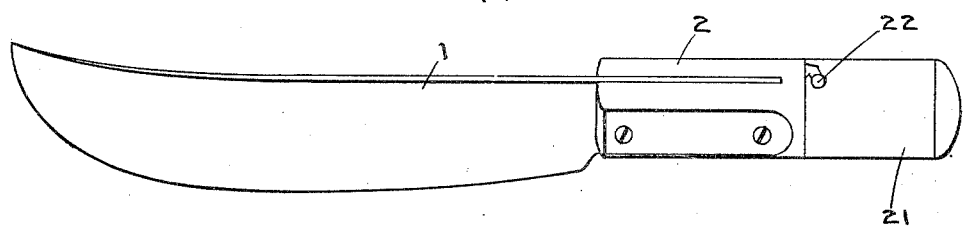
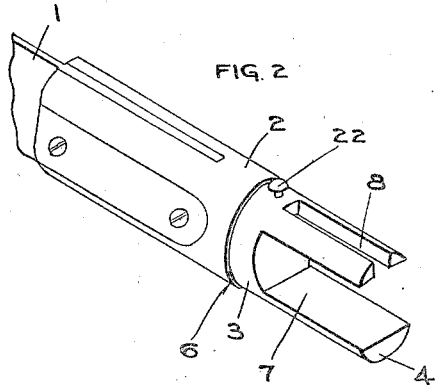
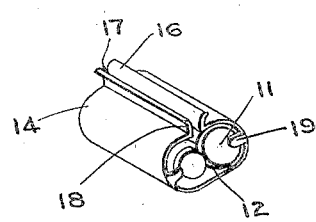
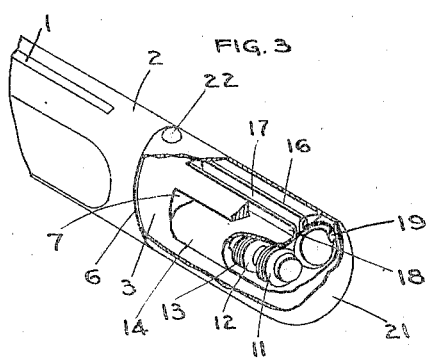
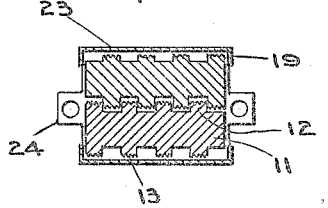
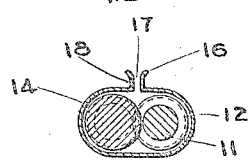
INVENTOR
W. R. WHITTEMORE.
BY
ATTORNEYS Patented Oct. 22, 1929

1,732,705

UNITED STATES PATENT OFFICE

WALLACE R. WHITTEMORE, OF LOS ANGELES, CALIFORNIA

KNIFE SHARPENER

Application filed October 24, 1927. Serial No. 228,284.

This invention relates to sharpening devices, and more particularly to a sharpening device adapted to be carried within the handle of a knife.

The invention has for an object, the provision of a combined knife handle and sharpening device so arranged that the latter is instantly removable whenever desired for use.

Another object is the provision of a cap for a sharpener of the above described nature, removably securable to the knife handle so as to form a continuation thereof which will in no wise interfere with the normal use of the knife.

Another object is the provision of a sharpener requiring very little skill on the part of the user, to quickly and easily impart a keen edge to a knife blade or other edged tool.

With the foregoing and other objects in view which will be made manifest in the following detailed description and specifically pointed out in the appended claims, reference is had to the accompanying drawings for an illustrative embodiment of the invention wherein:

Figure 1 is a perspective view of a knife embodying a sharpener of my invention, and its cap.

Fig. 2 is a perspective view of a portion of the knife of Figure 1, with the sharpener and cap removed.

Fig. 3 is a perspective view of a portion of the knife of Figure 1, showing the sharpener and cap in place. Portions are broken away to better reveal the structure.

Fig. 4 is a perspective view of the sharpening device removed from the knife.

Fig. 5 is a transverse sectional view of the sharpener of Figure 3.

Fig. 6 is a horizontal sectional view of a modification of the sharpener of my invention.

Referring to the accompanying drawings wherein similar reference characters designate similar parts throughout, my invention comprises a knife having a blade 1 carried by a handle 2 and secured thereto in the usual manner. The portion 3 of the handle 2 adjacent its end 4, remote from the blade 1, is of reduced diameter to provide a shoulder 6, and has a recess 7 extending therethrough, with a second smaller recess 8 extending from the recess 7 to the outside of the portion 3. Within these recesses is adapted to be removably received, the knife sharpener shown in Figure 4.

The sharpener comprises a pair of similar hardened steel rollers 11 disposed in parallelism with each other. Arranged about the periphery of each of the rollers 11, is a series of spaced flanges 12, each preferably integral with its associated roller 11. The flanges 12 of one roller 11 are disposed in alternation with those of the other roller 11, and each flange 12 is formed with a plurality of annular sharpening teeth 13 about its outer periphery.

The rollers 11 are mounted within a jacket 14 formed from a sheet of suitable material bent to loosely surround them. Instead of being joined however, the ends 16 of the sheet of material are left separated sufficiently to leave a slot 17 in one side of the jacket, equidistant from both rollers 11, permitting the insertion of the blade 1 to engage all of the sharpening teeth 13 simultaneously. The ends 16 of the sheet are bent upwards to provide guiding beads 18 to aid in holding the blade 1 in proper sharpening position relative to the rollers 11 while being drawn thereacross. Two lugs 19 are provided at each end of the jacket 14, to retain the rollers 11 therein.

The proportionate size and arrangement of the parts is such that the body of the sharpener fits nicely within the recess 7 of the handle 2, with the guiding beads 18 extending into the recess 8. A tubular cup 21 slidable over the sharpener and portion 3 of the handle 2 to abut the shoulder 6, provides means for retaining and concealing the sharpener within the handle; and escutcheon pins 22 driven into the handle 2 may be engaged with the slots 23 in the cup 21 to lock it in position. The cup 21 is of such configuration that when locked in position, it forms a continuation of the handle 2.

When it is desired to sharpen the knife, having the device of my invention incorporated therewith, it is necessary to merely remove the cap 21, whereupon the sharpener may be instantly removed from the handle. The blade 1 is then inserted in the slot 17 to contact the sharpening teeth 13, and movement of the blade back and forth across the sharpening teeth 13 will cause a keen edge to be imparted thereto in an exceedingly quick and easy manner. Of course, it is understood that the sharpener is not restricted to use with only the knife in the handle of which it is mounted, but that the blade of any knife may be sharpened by its use. The novel mounting of the sharpener which I have described however, provides a convenient place for storing the sharpener when not desired for use, where it is readily accessible, and which in no wise interferes with the normal use of the knife.

In Figure 6 is shown a modification of the sharpener of my invention, intended to be rigidly mounted in any convenient location instead of being incorporated within a knife handle. It is provided with rollers 11 having flanges 12 and sharpening teeth 13 identical with those of the first described form, and loosely retained within a slotted jacket 23, in all respects the same as the jacket 14, with the exception of being provided with lugs 24 to permit the sharpener to be permanently secured to a table top or shelf. In using this modification, the blade of the knife is drawn across the sharpening teeth in the manner already described, but because of its rigid mounting, its use is considerably facilitated.

It will be understood that various changes in the details of construction may be made without departing from the spirit or scope of the invention as defined by the appended claims.

I claim:

1. In combination, a knife handle having a recess therein, a sharpener adapted to be removably received in said recess and comprising a pair of hardened steel rollers disposed in parallelism with each other, a series of spaced flanges integral with each of said rollers, the flanges of one roller being disposed in alternation with those of the other roller, annular sharpening teeth formed about each of the flanges, a jacket formed from a sheet of material bent to loosely surround said rollers and having a slot extending longitudinally thereof adapted to permit insertion of the blade of a knife to engage all of said sharpening teeth simultaneously, and lugs at the ends of said jacket for retaining the rollers therein, a cup adapted to fit over said sharpener and the end of said handle, said cup forming a continuation of the handle, and means for removably securing said cup in position.

2. In combination, a tool handle having a recess in the end thereof, a sharpener adapted to be removably received in said recess, a tubular shaped cup adapted to fit over said sharpener and the end of said handle to form a continuation of the handle, and means for removably securing said cup in position.

3. In combination, a knife handle having a recess in the end thereof, a sharpener adapted to be removably received in said recess and comprising a pair of toothed rollers disposed in parallelism with each other, and a jacket loosely retaining said rollers, a tubular cup adapted to fit over said sharpener and the end of said handle to form a continuation of the handle, and means for removably securing said cup in position.

4. In combination, a knife handle having a recess in the end thereof, a sharpener adapted to be removably received in said recess and comprising a pair of toothed rollers disposed in parallelism with each other, and a jacket loosely retaining said rollers, a cup adapted to fit over said sharpener and the end of said handle to form a continuation of the handle, and means for removably securing said cup in position.

5. In combination, with a knife handle, a sharpener adapted to be carried by said handle and comprising a pair of toothed rollers disposed in parallelism with each other, and a jacket loosely retaining said rollers, a tubular cup adapted to fit over said sharpener and the end of said handle to form a continuation of the handle, and means for removably securing said cup in position.

6. In combination, a knife handle and a sharpener adapted to be removably received in a recess in the end of said handle, a cup adapted to fit over said sharpener and a reduced portion of the end of said handle to form a continuation of the handle, and means for removably securing said cup in position.

7. A knife sharpener comprising a pair of hardened steel rollers disposed in parallelism with each other, a series of spaced flanges integral with each of said rollers, the flanges of one roller being disposed in alternation with those of the other roller, annular sharpening teeth formed about each of the flanges, a jacket formed from a sheet of material bent to loosely surround said rollers and having a slot extending longitudinally thereof to permit insertion of the knife to engage all of said sharpening teeth simultaneously, there being beads at the edges of said slot for guiding the knife, and lugs at the ends of said jacket for retaining the rollers therein.

8. A knife sharpener comprising a pair of parallel rollers, a series of spaced flanges integral with each of said rollers, the flanges of one roller being disposed in alternation with those of the other roller, annular sharpening teeth formed about each of the flanges, a jacket loosely surrounding said rollers and having a slot therein to permit insertion of the knife to engage said sharpening teeth, and means for loosely retaining the rollers within the jacket.

In testimony whereof I have signed my name to this specification.

WALLACE R. WHITTEMORE.